W. O. SMITH.
VEHICLE SPRING.
APPLICATION FILED OCT. 16, 1912.
1,050,863.
Patented Jan. 21, 1913.
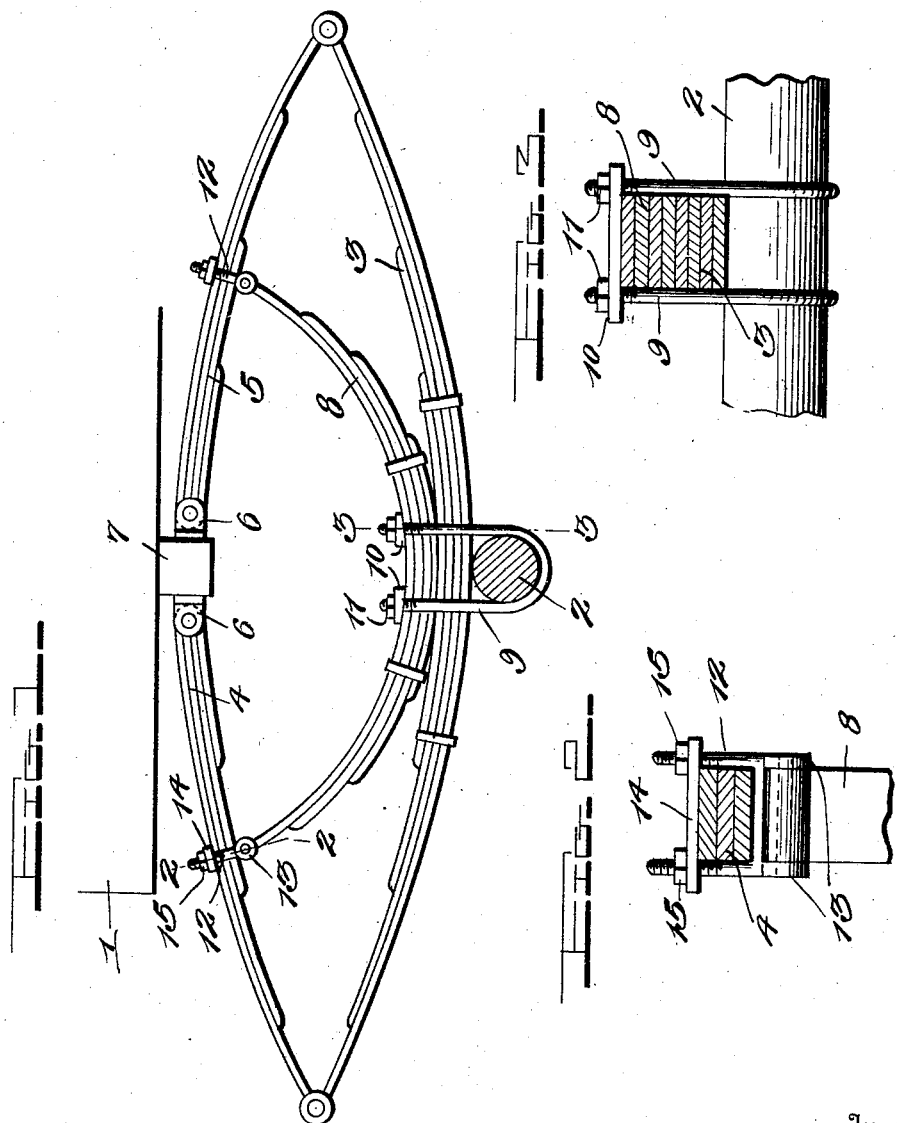
Witnesses
Chas. L. Griesbauer.
A. J. Hind.
Inventor
W. O. Smith,
By Watson E. Coleman,
Attorney

UNITED STATES PATENT OFFICE.

WALTER O. SMITH, OF PETALUMA, CALIFORNIA.

VEHICLE-SPRING.

1,050,863. Specification of Letters Patent. Patented Jan. 21, 1913.

Application filed October 16, 1912. Serial No. 726,097.

*To all whom it may concern:*

Be it known that I, WALTER O. SMITH, a citizen of the United States, residing at Petaluma, in the county of Sonoma and State of California, have invented certain new and useful Improvements in Vehicle-Springs, of which the following is a specification, reference being had to the accompanying drawings.

This invention relates to new and useful improvements in vehicle springs and has for its object to provide an improved spring which will take up the jar incident to traveling on rough roads and thereby eliminate the necessity of shock absorbers.

A further object of the invention resides in providing an elliptic spring, the upper half of which is formed in sections pivoted to the body of the vehicle and a still further object resides in providing an additional semi-elliptic spring member between the upper and lower halves of the aforesaid spring member.

Still another object of the invention resides in adjustably securing the ends of the interposed spring member to the sections of the upper half of the elliptic spring member, whereby the amount of leverage may be varied, as desired.

A still further object of the invention resides in the provision of a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a side elevation of the spring applied to use, showing the axle of the vehicle in section. Fig. 2 is a section through the device as seen on line 2—2, Fig. 1; and Fig. 3 is a similar view as seen on line 3—3, Fig. 1.

In describing my invention, I shall refer to the drawing in which similar reference characters designate corresponding parts throughout the several views and in which—

1 indicates the body of a vehicle of any desired type, and 2 the axle thereof, said axle having resting thereon, in the usual manner the lower half of an elliptic spring 3. The upper half of said spring is composed of a pair of sections 4 and 5, the outer ends of which are pivotally connected to the lower half in the usual manner, but the inner ends thereof are pivotally engaged with the ears or the like 6 carried on opposite faces of a bolster 7 carried on the under face of the body 1.

Interposed between the halves of the spring 3 is an additional or reinforcing spring 8, said latter spring being semi-elliptic and resting at its central portion on the upper face of the lower half of said spring 3. In order to secure the lower half of the spring 3 and the spring 8 together and simultaneously secure the same to the axle 2, a pair of U-bolts 9 are provided and engaged with the axle on opposite sides of the spring sections in the usual manner. The clamping plates 10 are then disposed over the upper face or upper leaf of the spring 8 to permit the ends of the bolts 9 to extend therethrough and nuts 11 are then engaged with the threaded free ends of said bolts to secure the clamping plates 10 in position and simultaneously secure the springs together. While I have particularly described this means to secure said springs together, and simultaneously secure the same to the axle, it will be appreciated that any other desired means for the purpose may be used. This interposed semi-elliptic spring faces upwardly and the ends thereof are adapted to be engaged respectively with the sections 4 and 5 of the upper half of the elliptic spring. This engagement of the spring 8 with the sections 4 and 5, is had by providing a pair of substantial U-bolts 12, the base of each of which is provided at the ends thereof with eyes 13. These bolts 12 are applied to the sections 4 and 5 facing upwardly, thereby positioning the eyes 13 below said sections 4 and 5 and to these eyes are pivotally connected the ends of the spring 8, while the bolts 12 are secured in position in the usual manner, by means of the clamping plates 14 and the nuts 15. Thus it will be seen that pivotal connection is had between the ends of the spring 8 and the sections of the upper half of the elliptic spring and it will further be seen that these pivotal points are capable of adjustment, as desired.

In practice, the weight of the vehicle body 1 forcing downwardly at the central portion of the upper half of the elliptic spring will obviously draw the ends of the lower half of said spring upwardly in view of the engagement of the ends of the spring 8 with the sections 4 and 5. The points of engagement of the ends of the spring 8 with the sections 4 and 5 form substantial fulcrum points for said sections 4 and 5, the latter forming substantial levers, and of course, upon the downward movement of the inner opposed ends of said sections 4 and 5, the ends of the spring 8 will be forced slightly downward. Through this action, it will be seen that the usual strain which is at the ends of the lower half of an elliptic spring, will be removed, thereby eliminating all danger of breaking the leaves of this portion of the spring, and it will still further be seen that the interposed spring will take up the jar incident to traveling on rough roads. It will be understood that through the medium of the U-bolts 12, the adjustment of the ends of the spring 8 may be had and through this medium of adjustment, it will be appreciated that the leverage and hence the elasticity of the lower spring system may be varied.

From the foregoing description of the construction of my improved device, the operation thereof will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to without departing from the spirit or sacrificing any of the principles of the invention.

While I have particularly described my improved spring and also shown the same so that the upper half thereof is formed in two sections and the lower half in one, it will be understood that the same may be entirely inverted, if desired and, of course, under these conditions, the securing of the body of the vehicle and the axle to the respective halves of the spring would be reverse to that shown in the drawing.

Having thus described this invention, what I claim is:—

1. The combination with an elliptic vehicle spring, one half thereof being formed in sections, pivoted at their inner ends to an object; of an interposed spring secured at its middle to the opposite half of said elliptic spring, and means to secure the ends respectively of said interposed spring to the sections of the first mentioned half of said elliptic spring.

2. The combination with an elliptic vehicle spring, the upper half thereof being formed in sections pivoted at their inner ends to the body of the vehicle; of an interposed spring secured at its middle to the lower half of said elliptic spring, and means to secure the ends respectively to the sections of the upper half of said elliptic spring.

3. The combination with an elliptic vehicle spring, the upper half thereof being formed in sections, pivoted at their inner ends to the body of the vehicle; of an interposed spring secured at its middle to the lower half of said elliptic spring, and means to adjustably secure the ends respectively of said interposed spring to the sections of the upper half of said elliptic spring.

4. The combination with a vehicle body having a bolster thereon, and an axle therefor; of an elliptic spring having the lower half thereof resting on said axle, the upper half of said spring being formed in sections and pivoted at their inner ends to the bolster of said body, an interposed spring resting on the lower half of the aforesaid spring, means to secure the last mentioned spring and the lower half of the aforesaid spring to said axle, and additional means to adjustably secure the ends of said interposed spring respectively to the sections of the upper half of said elliptic spring.

In testimony whereof I hereunto affix my signature in the presence of two witnesses.

WALTER O. SMITH.

Witnesses:
HENRY N. YOUNG,
A. B. WAY.